United States Patent
Li et al.

(10) Patent No.: US 7,430,430 B2
(45) Date of Patent: Sep. 30, 2008

(54) ADJUSTING A SIGNAL AT A DIVERSITY SYSTEM

(75) Inventors: Yingxue Li, Exton, PA (US); William Reinisch, New York, NY (US); Haim Harel, New York, NY (US)

(73) Assignee: Magnolia Broadband Inc., Bedminster, NJ (US)

( * ) Notice: Subject to any disclaimer, the term of this patent is extended or adjusted under 35 U.S.C. 154(b) by 742 days.

(21) Appl. No.: 10/737,012

(22) Filed: Dec. 16, 2003

(65) Prior Publication Data

US 2005/0130597 A1    Jun. 16, 2005

(51) Int. Cl.
*H04B 7/005* (2006.01)
(52) U.S. Cl. ............... 455/522; 455/101; 455/127.2
(58) Field of Classification Search ............. 455/522, 455/69, 562.1, 101, 103, 127.1, 127.2, 127.3, 455/127.4, 188.1, 189.1, 232.1–276.1
See application file for complete search history.

(56) References Cited

U.S. PATENT DOCUMENTS

| | | | |
|---|---|---|---|
| 4,334,316 A * | 6/1982 | Tanaka ................. | 455/139 |
| 5,642,353 A | 6/1997 | Roy, III et al. | |
| 5,781,845 A | 7/1998 | Dybdal et al. .......... | 455/65 |
| 5,832,044 A | 11/1998 | Sousa et al. | |
| 5,832,387 A | 11/1998 | Bae et al. ............ | 455/522 |
| 5,946,346 A * | 8/1999 | Ahmed et al. .......... | 375/219 |
| 5,960,039 A | 9/1999 | Martin et al. ......... | 375/267 |
| 5,991,330 A | 11/1999 | Dahlman et al. | |
| 5,999,826 A | 12/1999 | Whinnett | |
| 6,185,440 B1 | 2/2001 | Barratt et al. | |
| 6,226,509 B1 | 5/2001 | Mole et al. | |
| 6,236,363 B1 | 5/2001 | Robbins et al. | |
| 6,330,294 B1 | 12/2001 | Ansbro et al. | |
| 6,343,218 B1 | 1/2002 | Kaneda et al. | |

(Continued)

FOREIGN PATENT DOCUMENTS

EP    0 986 193    3/2000

(Continued)

OTHER PUBLICATIONS

PCT, Notification of Transmittal of the International Search Report and The Written Opinion of the International Searching Authority, dated Apr. 4, 2005 for International Application No. PCT/US2004/041976, 13 pages.

(Continued)

*Primary Examiner*—Blane J Jackson
(74) *Attorney, Agent, or Firm*—Pearl Cohen Zedek Latzer, LLP (57) ABSTRACT

Adjusting a signal includes receiving signals and quality indicators at an adjuster. The quality indicators include as least one of a power control group boundary signal, a power control group index, a PN code per active finger, a reverse power control bit per active finger, an energy per chip over noise power spectral density ratio per active finger, channel estimates I/Q per active finger, an energy per bit over noise power spectral density, a transmit AGC signal, a total receive power, and any combination of the preceding. A signal adjustment is calculated according to the quality indicators, and the signals are adjusted according to the signal adjustment to yield adjusted signals.

35 Claims, 4 Drawing Sheets

U.S. PATENT DOCUMENTS

| | | | |
|---|---|---|---|
| 6,351,499 B1 | 2/2002 | Paulraj et al. | 375/267 |
| 6,369,758 B1 | 4/2002 | Zhang | 342/383 |
| 6,392,988 B1 | 5/2002 | Allpress et al. | |
| 6,492,942 B1 | 12/2002 | Kezys | |
| 6,636,495 B1 | 10/2003 | Tangemann | |
| 6,704,370 B1 | 3/2004 | Chheda et al. | |
| 6,745,009 B2 | 6/2004 | Raghothaman | |
| 6,795,411 B1* | 9/2004 | Dino et al. | 370/329 |
| 6,810,264 B1 | 10/2004 | Park et al. | |
| 6,859,643 B1 | 2/2005 | Ma et al. | |
| 6,882,228 B2 | 4/2005 | Rofougaran | |
| 7,020,490 B2* | 3/2006 | Khatri | 455/561 |
| 7,085,239 B2* | 8/2006 | Ling et al. | 370/252 |
| 7,221,956 B2* | 5/2007 | Medvedev et al. | 455/522 |
| 7,242,727 B2* | 7/2007 | Liu et al. | 375/295 |
| 7,248,841 B2* | 7/2007 | Agee et al. | 455/101 |
| 7,260,370 B2* | 8/2007 | Wang et al. | 455/135 |
| 7,269,436 B2* | 9/2007 | Won | 455/522 |
| 2002/0145968 A1 | 10/2002 | Zhang et al. | 370/206 |
| 2003/0112880 A1 | 6/2003 | Walton et al. | |
| 2004/0048584 A1 | 3/2004 | Vaidyanathan et al. | |
| 2004/0085239 A1 | 5/2004 | Ukena et al. | |
| 2005/0059355 A1 | 3/2005 | Liu | |
| 2005/0143113 A1 | 6/2005 | Lee et al. | |

FOREIGN PATENT DOCUMENTS

| | | |
|---|---|---|
| EP | 0 999 658 A2 | 5/2000 |
| EP | 1 204 217 A1 | 5/2002 |
| EP | 1 255 369 A1 | 11/2002 |
| EP | 1 282 242 | 2/2003 |
| EP | 1 282 244 | 2/2003 |
| EP | 1 284 545 | 2/2003 |
| EP | 1 262 031 | 5/2004 |
| GB | 2 353 437 A | 2/2001 |
| JP | 09-238098 | 9/1997 |
| JP | 2000-151484 | 5/2000 |
| WO | WO 97/24818 | 7/1997 |
| WO | WO 00/36764 | 6/2000 |
| WO | WO 00/79701 | 12/2000 |
| WO | WO 01/69814 | 9/2001 |
| WO | WO 03/005606 A1 | 1/2003 |
| WO | WO 03/073648 A1 | 9/2003 |
| WO | WO 03/090386 | 10/2003 |
| WO | WO 2004/045108 | 5/2004 |
| WO | WO 2005/081444 | 9/2005 |

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

"Qualcomm Announces World's First Zero-IF Chipset for CDMA Devices", 3GNewsroom.com 3G news, http://www.3gnewsroom.com/3g_news/feb_02/news_1822.shtml, 3 pages, Feb. 4, 2002.

"Qualcomm's MSM6500 to Support CDMA2000 IX, 1xEV-DO and GSM/GPRS", http://www.3gnewsroom.com/3g_news/nov_02/news_2718.shtml, 2 pages, Nov. 13, 2002.

Pending U.S. Appl. No. 10/082,351, filed Feb. 26, 2002, entitled "Smart Antenna Based Spectrum Multiplexing Using A Pilot Signal" by Peter Cripps, et al., 37 total pages.

Pending U.S. Appl. No. 10/131,612, filed Apr. 25, 2002, entitled "Smart Antenna Based Spectrum Multiplexing Using Existing Pilot Signals For Orthogonal Frequency Division Multiplexing (OFDM) Modulations" by Haim Harel, et al., 31 total pages.

Pending U.S. Appl. No. 10/141,342, filed May 9, 2002, entitled "Communication Device With Smart Antenna Using A Quality-Indication Signal" by Haim Harel, et al., 52 total pages.

"Qualcomm Announces New Power Management Chips for 3G Wireless Devices", http://www.3gnewsroom.com/3g_news/feb_03/news_3074.shtml, 2 pages, Feb. 19, 2003.

Qualcomm CDMA Technologies, "MSM6500™ Chipset Solution", © 2003 Qualcomm Incorporated, 12 pages, Sep. 2003.

* cited by examiner

ADJUSTING A SIGNAL AT A DIVERSITY SYSTEM

TECHNICAL FIELD

This invention relates generally to the field of communication systems and more specifically to adjusting a signal at a diversity system.

BACKGROUND

A diversity antenna system of a mobile device may include antenna elements that receive signals from and transmit signals to a base station. Signal reception and transmission may be improved by steering the radiation pattern of the antenna elements. For diversity reception, the signal-to-noise ratio (SNR) of an incoming signal may be improved by directing the main lobe of the pattern towards the signal. For diversity transmission, the pattern may be directed toward the base station to improve transmission. An adjuster may be used to adjust a signal to steer the radiation pattern. Known techniques for adjusting signals, however, may be inefficient. Efficient adjustment of signals may be desired.

SUMMARY

In accordance with an embodiment of the present invention, disadvantages and problems associated with previous techniques for communication systems may be reduced or eliminated.

According to one embodiment of the present invention, adjusting a signal includes receiving signals and quality indicators at an adjuster. The quality indicators include as least one of a power control group boundary signal, a power control group index, a PN code per active finger, a reverse power control bit per active finger, an energy per chip over noise power spectral density ratio per active finger for a pilot channel, channel estimates I/Q per active finger, an energy per bit over power spectral density for a traffic channel, a total receive power, a transmit AGC signal, and any combination of the preceding. A signal adjustment is calculated according to the quality indicators, and the signals are adjusted according to the signal adjustment to yield adjusted signals.

Certain embodiments of the invention may provide one or more technical advantages. A technical advantage of one embodiment may be that an adjuster may adjust the phase, the amplitude, or both phase and amplitude of signals in accordance with one or more quality indicators in order to create differences between signals. The differences may be used to differentiate the signals.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
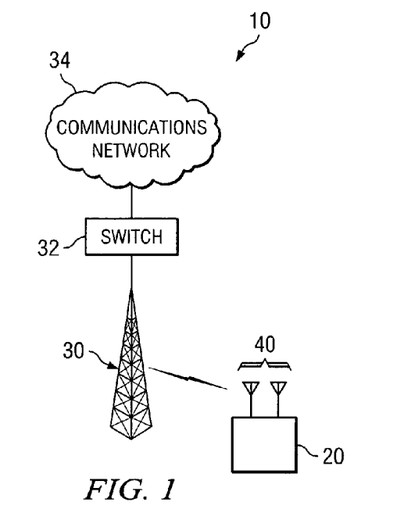
FIG. 1 is a block diagram illustrating an embodiment of a network that communicates with a mobile device that has a diversity system for adjusting a phase of a signal.

FIG. 1 is a block diagram illustrating an embodiment of a network 10 that communicates with a mobile device that has a diversity system for adjusting a signal. In general, the mobile device includes antenna elements that receive and transmit signals, where each signal has an initial phase and an initial amplitude. The diversity system may adjust the phase, the amplitude, or both the phase and amplitude of the signals in accordance with one or more quality indicators in order to create differences between signals. The differences may be used to differentiate the signals.

According to the illustrated example, a mobile device 20 communicates with a network 10 that includes a base station 30, a switch 32, and a communication network 34 coupled as shown in FIG. 1. Mobile device 20 includes an antenna system 40 that receives signals transmitted by base station 30 and transmits signals to base station 30. A signal comprises an electrical quantity such as current or voltage that may be used to communicate information between, for example, base station 30 and mobile device 20. For example, signals may comprise data packets communicating information such as data, video, multimedia, any other suitable type of information, or any combination of the preceding. A signal may comprise a radio frequency signal.

Mobile device 20 has a diversity system that includes one or more adjusters. An adjuster adjusts a signal in accordance with quality indicators. Mobile device 20 may comprise, for example, a personal digital assistant, a cellular telephone, a mobile handset, or any other device suitable for communicating signals to and from network 10. Mobile device 20 may support, for example, simple Internet Protocol (IP), mobile IP, or any other suitable communication protocol, and may support cellular Code Division Multiple Access (CDMA), Personal Communications Service (PCS) CDMA, Advanced Mobile Phone Service (AMPS), or other communication technology.

Network 10 may comprise one or more devices operable to communicate with mobile device 20. According to the illustrated embodiment, network 10 includes base station 30, switch 32, and communication network 34. Network 10, however, may include more, fewer, or other suitable devices. Network 10 may support, for example, cellular technology, non-cellular technology such as WiMAX, wireless technology, point-to-point technology, other suitable technology, or any combination of the preceding.

Base station 30 provides mobile device 20 with access to network 10. Base station 30 includes a base transceiver station and a base station controller. The base transceiver station communicates signals to and from mobile device 20. The base station controller manages the operation of the base transceiver station. The wireless link between mobile device 20 and base station 30 is typically a radio frequency link that may be cellular in network organization. Base station 30 transmits signals associated with the base station coverage area as dictated by switch 32 and communication network 34.

Communication network 34 allows mobile device 20 to communicate with other networks or devices. Communication network 34 may comprise all or a portion of a public switched telephone network (PSTN), a public or private data network, the Internet, a wireline or wireless network, a local, regional, or global communication network, an enterprise intranet, other suitable communication link, or any combination of the preceding.

Various modifications, additions, or omissions may be made to network 10 without departing from the scope of the invention. Moreover, the operations of network 10 may be performed using logic comprising hardware, software, or any combination of the preceding.

Figure 2:
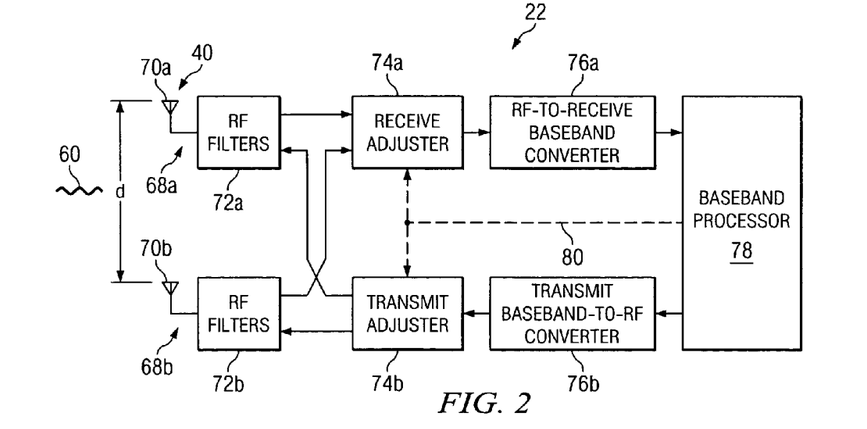
FIG. 2 is a block diagram illustrating an embodiment of a diversity system of the mobile device of FIG. 1.

FIG. 2 is a block diagram illustrating one embodiment of a diversity system 22 of mobile device 20 of FIG. 1. According to the illustrated embodiment, diversity system 22 includes antenna system 40, radio frequency (RF) filters 72, one or more adjusters 74, one or more converters 76, and a baseband processor 78 coupled as shown. A channel 68 of diversity system 22 refers to any portion of system 100 that includes a path for a signal. As an example, channel 68a includes adjuster 74a and converter 76a, and channel 68b includes adjuster 74b and converter 76b.

According to one embodiment of operation, antenna system 40 receives receive signals 60 that carry encoded information, and RF filters 72 filter receive signals 60. Adjuster 74a adjusts a receive signal 60 according to quality indicators to yield an adjusted receive signal 60. Adjuster 74a combines adjusted and unadjusted signals 60 to form a combined signal. The adjustment may improve the quality of the signal. Converter 76a converts the frequency of combined receive signal 62 from an RF frequency band to baseband frequency band. Baseband processor 78 processes combined receive signal 62 to yield decoded information.

According to one embodiment of operation, baseband processor 78 encodes information of a transmit signal 60 to be transmitted. Converter 76b converts the frequency of transmit signal 60 from a baseband frequency band to an RF frequency band. Adjuster 74b splits transmit signal 60 into split signals and adjusts one or more of the split signals according to quality indicators to yield one or more adjusted transmit signals 60. The adjustment may improve the quality of transmitted signals as received by a receiver. RF filters 72 filter transmit signals 60, and antenna system 40 transmits transmit signals 60.

According to one embodiment, antenna system 40 may comprise any suitable number of antenna elements 70. In the illustrated embodiment, antenna system 40 comprises antenna elements 70a and 70b, each of which may transmit and receive signals. Antenna elements 70 may comprise any suitable antenna, for example, wipe antennas, stubby antennas, patch antennas, or magnetic antennas. Antenna elements 70 are separated by a distance d. Distance d may be defined as any separation such that signals transmitted from or received by the antenna elements 70 have a low correlation coefficient. According to one embodiment, distance d may be in a range between 0.10 to 1.0 wavelength $\lambda$, for example, approximately 0.13 $\lambda$, to yield a correlation coefficient of approximately 0.7.

Radio frequency filters 72 filter signals 60. In the illustrated embodiment, signal 60 received or transmitted by antenna element 70a is filtered by RF filter 72a, and signal 60 received or transmitted by antenna element 70b is filtered by RF filter 72b. According to one embodiment, RF filters 72 comprise duplexors, diplexors, or both. In general, a duplexor comprises a filter that filters signals according to the frequency separation of the transmit and receive frequencies, which allows a transmitter and receiver to use the same antenna element 70. A diplexor may comprise a switch, a filter, or any suitable device for separating signal frequencies according to different frequency bands. For example, frequency bands that may be diplexed are the 800 MHz band and the 1.9 GHz band. Such diplexor operation may be useful for mobile devices 20 capable of operating in dual band systems.

According to one embodiment, signal 60 received by antenna element 70a may be filtered by a duplexor configured to filter receive frequencies. A diplexor separates the signal to obtain a particular frequency band at which mobile device 20 operates. A signal received at antenna element 70b may be filtered in a similar manner. Other filters may be used as RF filters 72 without deviating from the scope of the invention. Any suitable number of antenna elements 70 may be used in combination with any suitable number of RF filters 72 to produce any suitable number of desired filtered signals.

Adjuster 74 adjusts a signal 60 in accordance with one or more quality indicators to yield an adjusted signal 60. Adjuster 74 may adjust a signal 60 by shifting the phase of signal 60, changing the amplitude of signal 60, performing any other suitable adjustment, or any combination of the preceding. The quality indicators may be calculated by adjuster 74, received from baseband processor 78, received from an alternative source to baseband processor 78, or any combination of the preceding. Adjuster 74 may calculate at least some of the quality indicators, receive at least some of the quality indicators from baseband processor 78, receive at least some of the quality indicators from an alternative source to baseband processor 78, or any combination of the preceding.

According to one embodiment of an operation to receive signals 60, adjuster 74a comprises a receive adjuster 74a. Receive adjuster 74a adjusts filtered receive signals 60 and combines the adjusted filtered receive signals 60 to yield a reduced number of combined receive signals 60. According to one embodiment of an operation to transmit signals 60, adjuster 74b comprises a transmit adjuster 74b. Transmit adjuster 74b splits combined transmit signal 60 to yield an increased number of separate transmit signals 60, and adjusts the separate transmit signals 60. Diversity system 22 may include a receive adjuster 74a, a transmit adjuster 74b, or both.

Adjuster 74 may be operable to function in analog mode or digital mode, in baseband mode or RF mode, and therefore may be located at any suitable location of mobile device 20. For example, adjuster 74 may adjust baseband signals in either digital or analog mode. As another example, adjuster 74 may adjust RF signals. According to one embodiment, adjuster 74 may be implemented using multiplier techniques, summation techniques, or both. Multiplier techniques may use devices, logic, circuits, hardware, software, processors, filters, any other device suitable for multiplying signals, or any combination of the preceding. Summation techniques may use devices, logic, circuits, hardware, software, processors, filters, combiners, any other device for summing signals, or any combination of the preceding. Adjuster 74 may support any suitable band such as cellular CDMA, PCS CDMA, other band, or any combination of the preceding.

Converter 76a may comprise an RF-to-receive baseband converter that downconverts the frequency of combined receive signal 60 from an RF frequency band to a baseband frequency band. Converter 76b may comprise a receive baseband-to-RF converter that upconverts the frequency of combined transmit signal 60 from a baseband frequency band to an RF frequency band. It is understood that an RF frequency band may include any frequency band in the range of mobile and fixed wireless communication, such as the 800 MHz band, 1.9 GHz band, or any other suitable frequency band suitable for operating as a carrier of network 10.

According to one embodiment, baseband processor 78 may provide adjusters 76 with quality indicators using a bus 80. Baseband processor 78 also processes a receive signal 60 to yield decoded information. To yield decoded information, baseband processor 78 spreads receive signal 60 into symbol level signals, and then combines the symbol level signals to retrieve the information. The symbol level signals may be combined coherently based on maximal ratio combining.

Various modifications, additions, or omissions may be made to system 22 without departing from the scope of the invention. For example, baseband processor 78 may include additional logic to process signals according to a wireless protocol used by network 10. As another example, adjuster 74 may be modified to include an antenna combiner or any element suitable for summing analog signals. As yet another example, adjuster 74 may located anywhere in mobile device 20 to adjust and combine RF signals, baseband signals, filtered signals, or any suitable signal. For example, adjuster 74 may be located between antenna system 40 and RF filters 72. As yet another example, system 22 may include any number of receive adjusters 74a, transmit adjusters 74b, or both, for example, system 22 may include any number of receive adjusters 74a and no transmit adjusters 74b, or system 22 may include any number of transmit adjusters 74b and no receive adjusters 74a. Moreover, the operations of system 22 may be performed using logic comprising hardware, software, or any combination or arrangement of processors or modules suitable for adjusting a signal as disclosed.

Figure 3:
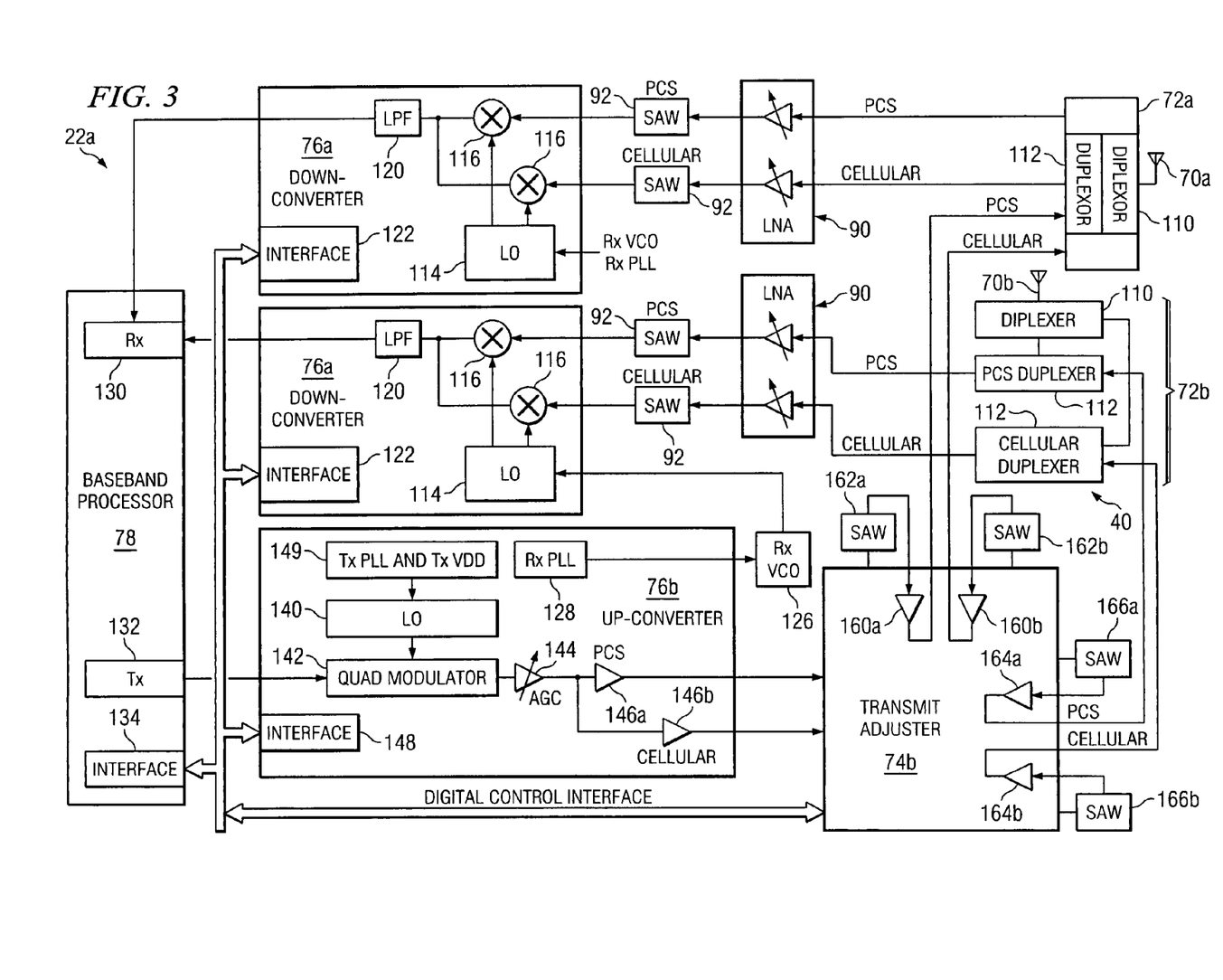
FIG. 3 is a block diagram illustrating one embodiment of a diversity system that includes one embodiment of a transmit adjuster for adjusting signals.

FIG. 3 is a block diagram illustrating one embodiment of diversity system 22a that includes one embodiment of transmit adjuster 74b that adjusts signals in accordance with quality indicators received from baseband processor 78. According to the illustrated embodiment, diversity system 22a includes antenna system 40, radio frequency (RF) filters 72, transmit adjuster 74b, one or more low noise amplifiers (LNAs) 90, one or more surface acoustic wave filters (SAWs) 92, converters 76, and baseband processor 78 coupled as shown. According to the embodiment, diversity system 22a includes channel paths that support different bands. As an example, one channel path may support PCS CDMA, and another channel path may support cellular CDMA.

According to the illustrated embodiment, diversity system 22a includes features for receiving signals such as antenna elements 70. Antenna elements 70 receive signals that carry encoded information. RF filters 72 filter the received signals, where each RF filter 72 includes a diplexor 110 and one or more duplexors 112. Diplexor 110 separates signal frequencies according to different frequency bands, for example, PCS CDMA and cellular CDMA bands. LNAs 90 amplify the signals, and SAWs 92 filter the signals.

Converters 76a comprise down-converters that convert the frequency of received signals from an RF frequency band to baseband frequency band. According to the illustrated embodiment, a converter 76a includes a local oscillator (LO) 114, mixers 116, a low pass filter (LPF) 120, and an interface 122 coupled as shown. Local oscillator 114 receives signals from a receive voltage-controlled oscillator (VCO) 126 and a receive phase-locked loop (PLL) 128 and generates a clock signal. Mixers 116 mix signals from SAWs 92 and the clock signal from local oscillator 114. LPF 120 filters signals from mixers 116. Interface 122 communicates with baseband processor 78.

Baseband processor 78 processes received signals to yield decoded information, and encodes information of outgoing signals to be transmitted. According to the illustrated embodiment, baseband processor 78 includes a receive input 130, a transmit output 132, and a control interface 134. Receive input 130 receives signals from converters 76a, and transmit output 132 sends outgoing signals to converter 76b. Control interface 134 communicates with converters 76 and transmit adjuster 74b.

According to the illustrated embodiment, diversity system 22a includes features for transmitting signals such as converter 76b. Converter 76b comprises an up-converter that converts the frequency of outgoing signals from a baseband frequency band to an RF frequency band. According to the illustrated embodiment, converter 76b includes a local oscillator (LO) 140, a quad modulator 142, an automatic gain control (AGC) 144, amplifiers 146, and an interface 148 coupled as shown. Local oscillator 140 receives signals from a transmit voltage-controlled oscillator (VCO) and a transmit phase-locked loop (PLL) 149. Quad modulator 142 modulates signals, AGC 144 controls the amplitude of signals, and amplifiers 146 amplify signals. Interface 148 communicates with baseband processor 78, converter 76a, and transmit adjuster 74b.

According to one embodiment, transmit adjuster 74b adjusts signals in accordance with quality indicators received from baseband processor 78. Transmit adjuster 74b may include an interface, control logic, a digital processing block, a test bus, a memory bus, one or more vector modulators, one or more driver amplifiers, one or more power amplifiers, other suitable device, or any combination of the preceding. The control logic controls the operation of the vector modulators and the driver amplifiers. The control logic receives quality indicators from baseband processor 78, determines signal adjustments based on the quality indicators, and instructs the vector modulators, driver amplifiers, or both to implement the signal adjustments.

A quality indicator may comprise a value for a parameter that may be used to measure signal quality. For illustration purposes only, if CDMA technology is used, quality indicators may describe CDMA power control groups. Quality indicators for each CDMA power control group may be used. Quality indicators may include, for example, a power control group boundary signal, a power control group index, a PN code per active finger, a reverse power control bit per active finger, an energy per chip over noise power spectral density (Epc/Nt) ratio per active finger, channel estimates I/Q per active finger, an energy per bit over noise power spectral density (Eb/Nt), a transmit AGC signal, and a total receive power.

A power control group boundary signal indicates the start of a power control group. According to one embodiment, a strobe signal may be synchronized with a power control group boundary signal at, for example, approximately 800 MHz. A power control group index comprises a sequence identifier such as a sequence number. A PN code per active finger identifies a base station or sector. A reverse power control bit per active finger, which may be transmitted by a base station, indicates whether the mobile device needs to increase or decrease transmission power. The energy per chip (Epc) indicates the energy per chip of the pilot channel, and the noise power spectral density (Nt) is the noise power spectral density within the bandwidth, so energy per chip over noise power spectral density ratio per active finger may indicate signal quality. Channel estimates I/Q per active finger may be used to demodulate signals at a channel, and may be extracted from the forward pilot channel. Energy per bit (Eb) over noise power spectral density (Nt) indicates the quality of traffic channels, and may be provided for the fundamental channel, supplemental channel, or both. The total receive power may describe the total receive power per symbol.

Transmit adjuster 74b may use any quality indicator or any combination of quality indicators to determine the signal adjustments. According to one embodiment, transmit adjuster 74b may use the following quality indicators, which may be given for each power control group: a power control group boundary signal, a PN code per active finger, a reverse power control bit per active finger, an energy per chip over noise power spectral density ratio per active finger, channel estimates I/Q per active finger, a transmit AGC signal, a total receive power, or any combination of the preceding.

According to the illustrated embodiment, transmit adjuster 74b includes amplifiers 160 and 164 and SAWs 162 and 166. Amplifiers 160 and 164 amplify outgoing signals, and SAWs 162 and 164 filter the outgoing signals. According to one embodiment, amplifiers 160a and 164a amplify outgoing signals for one channel path, and amplifiers 160b and 164b amplify outgoing signals for another channel path. SAWs 162a and 164a filter the outgoing signals channel path for one channel path, and SAWs 162b and 164b filter the outgoing signals for another channel path. Transmit adjuster 74b may be fabricated using, for example, a silicon germanium (SiGe) bipolar complementary metal oxide semiconductor (BiCMOS) process, and may be fabricated as a Very Thin Profile Quad Flat Non Leaded (VQFN) package.

RF filters 72b filter outgoing signals, and may include a diplexor 110 and one or more duplexors 112. Antenna elements 70 of antenna system 40 transmits the signals.

Various modifications, additions, or omissions may be made to system 22a without departing from the scope of the invention. Moreover, the operations of system 22a may be performed using logic comprising hardware, software, or any combination or arrangement of processors or modules suitable for adjusting a signal as disclosed.

Figure 4:
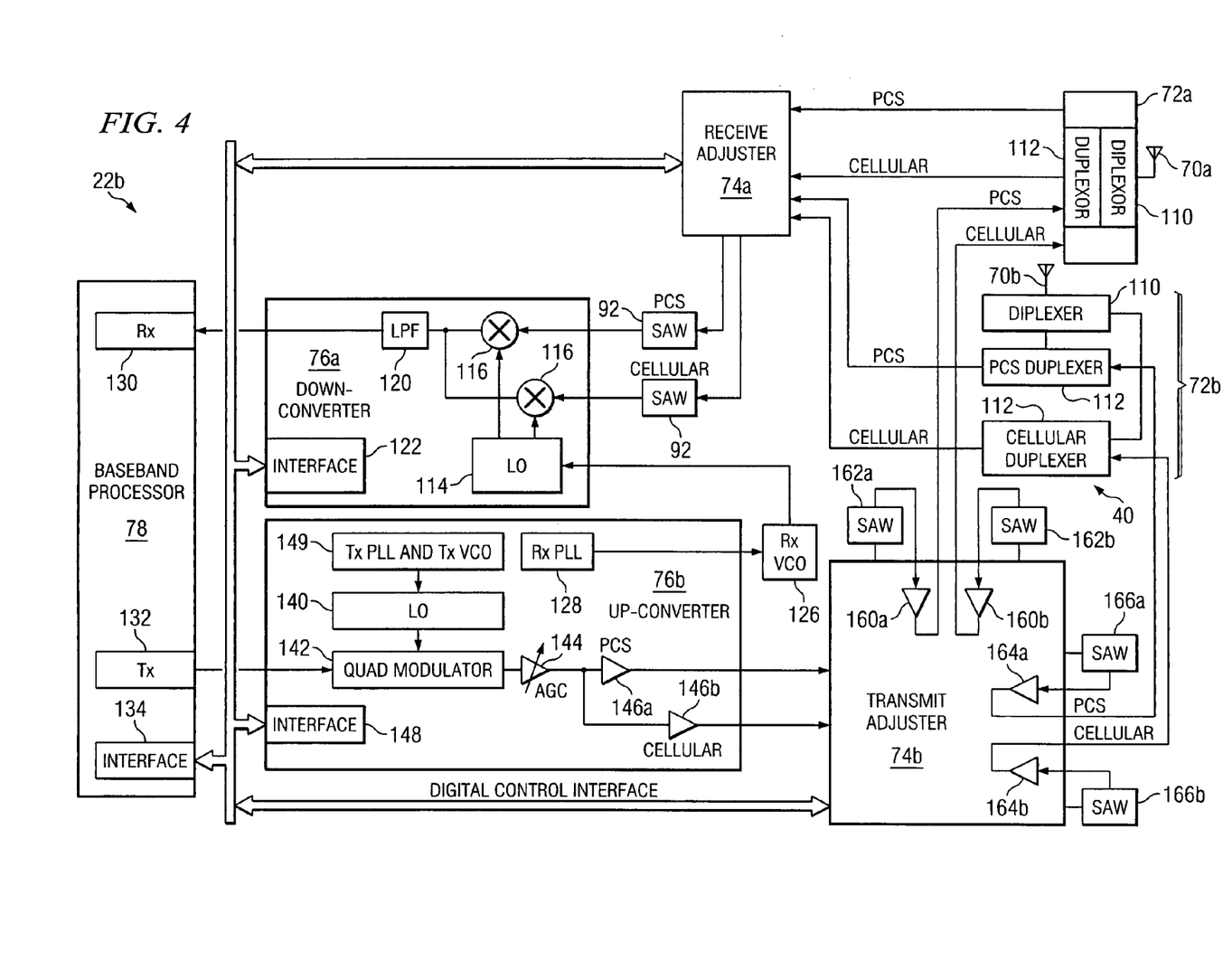
FIG. 4 is a block diagram illustrating one embodiment of a diversity system that includes embodiments of a receive adjuster and a transmit adjuster for adjusting signals.

FIG. 4 is a block diagram illustrating another embodiment of diversity system 22b that includes embodiments of receive adjuster 74a and transmit adjuster 74b that adjust signals in accordance with quality indicators received from baseband processor 78. According to the illustrated embodiment, diversity system 22b includes antenna system 40, radio frequency (RF) filters 72, receive adjuster 74a, transmit adjuster 74b, converters 76, one or more surface acoustic wave filters (SAWs) 92, and baseband processor 78 coupled as shown. According to the embodiment, diversity system 22b includes channel paths that support different bands. As an example, one channel path may support PCS CDMA, and another channel path may support cellular CDMA.

According to the illustrated embodiment, diversity system 22b includes features for receiving signals such as antenna elements 70. Antenna elements 70 receive signals that carry encoded information. RF filters 72 filter the received signals, where each RF filter 72 includes a diplexor 110 and one or more duplexors 112. Diplexor 110 separates signal frequencies according to different frequency bands, for example, PCS CDMA and cellular CDMA bands.

According to the embodiment, receive adjuster 74a adjusts signals in accordance with quality indicators received from baseband processor 78. Receive adjuster 74a may include an interface, control logic, one or more vector modulators, and one or more low noise amplifiers. The control logic controls the operation of the vector modulators and low noise amplifiers. The control logic receives quality indicators, determines signal adjustments based on the quality indicators, and instructs the vector modulators to implement the signal adjustments. According to one embodiment, receive adjuster 74a may use the following quality indicators, which may be given for each power control group: a power control group boundary signal, a power control group index, a PN code per active finger, an energy per chip over noise power spectral density (Epc/Nt) ratio per active finger, channel estimates I/Q per active finger, an energy per bit over noise power spectral density (Eb/Nt), a transmit AGC signal, a total receive power, or any combination of the preceding. Receive adjuster 74a may be fabricated using, for example, SiGe BiCMOS process, and may be fabricated as a VQFN package.

SAWs 92 filter the received signals. Converter 76a comprises a down-converter that converts the frequency of received signals from an RF frequency band to baseband frequency band. According to the illustrated embodiment, converter 76a includes a local oscillator (LO) 114, mixers 116, a low pass filter (LPF) 120, and an interface 122 coupled as shown. Local oscillator 114 receives signals from a receive voltage-controlled oscillator (VCO) 126 and a receive phase-locked loop (PLL) 128 and generates a clock signal. Mixers 116 mix signals from SAWs 92 and the clock signal from local oscillator 114. LPF 120 filters signals from mixers 116. Interface 122 communicates with baseband processor 78.

Baseband processor 78 processes received signals to yield decoded information, and encodes information of outgoing signals to be transmitted. According to the illustrated embodiment, baseband processor 78 includes a receive input 130, a transmit output 132, and a control interface 134. Receive input 130 receives signals from converters 76a, and transmit output 132 sends outgoing signals to converter 76b. Control interface 134 communicates with converters 76 and transmit adjuster 74b.

According to the embodiment, transmit adjuster 74b adjust signals in accordance with quality indicators received from baseband processor 78. Transmit adjuster 74b is described in more detail with reference to FIG. 3. RF filters 72b filter outgoing signals, and may include a diplexor 110 and one or more duplexors 112. Antenna elements 70 of antenna system 40 transmits the signals.

Various modifications, additions, or omissions may be made to system 22b without departing from the scope of the invention. Moreover, the operations of system 22b may be performed using logic comprising hardware, software, or any combination or arrangement of processors or modules suitable for adjusting a signal as disclosed.

Figure 5:
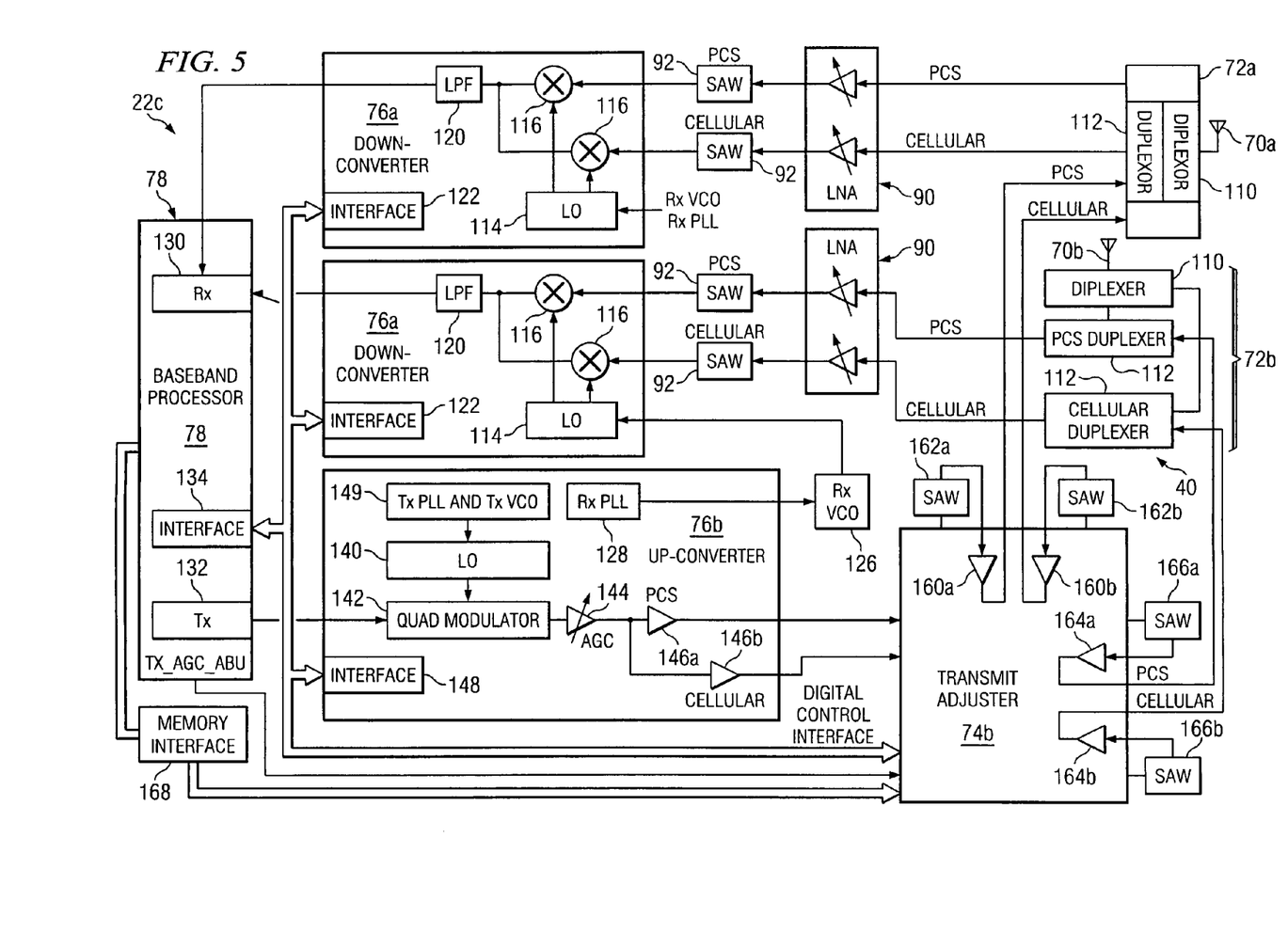
FIG. 5 is a block diagram illustrating another embodiment of a diversity system that includes one embodiment of a transmit adjuster for adjusting signals.

FIG. 5 is a block diagram illustrating another embodiment of a diversity system 22c that includes one embodiment of a transmit adjuster 74b that may adjust signals using one or more quality indicators that need not be provided by baseband processor 78. As an example, transmit adjuster 74b may be used with a closed interface baseband processor 78. According to the illustrated embodiment, diversity system 22c includes antenna system 40, radio frequency (RF) filters 72, transmit adjuster 74b, one or more low noise amplifiers (LNAs) 90, one or more surface acoustic wave filters (SAWs) 92, converters 76, and baseband processor 78 coupled as shown. According to the embodiment, diversity system 22c includes channel paths that support different bands. As an example, one channel path may support PCS CDMA, and another channel path may support cellular CDMA.

According to the illustrated embodiment, diversity system 22c includes features for receiving signals such as antenna elements 70. Antenna elements 70 receive signals that carry encoded information. RF filters 72 filter the received signals, where each RF filter 72 includes a diplexor 110 and one or more duplexors 112. Diplexor 110 separates signal frequencies according to different frequency bands, for example, PCS CDMA and cellular CDMA bands. LNAs 90 amplify the signals, and SAWs 92 filter the signals.

Converters 76a comprise down-converters that convert the frequency of received signals from an RF frequency band to baseband frequency band. According to the illustrated embodiment, a converter 76a includes a local oscillator (LO) 114, mixers 116, a low pass filter (LPF) 120, and an interface 122 coupled as shown. Local oscillator 114 receives signals from a receive voltage-controlled oscillator (VCO) 126 and a receive phase-locked loop (PLL) 128 and generates a clock signal. Mixers 116 mix signals from SAWs 92 and the clock signal from local oscillator 114. LPF 120 filters signals from mixers 116. Interface 122 communicates with baseband processor 78.

Baseband processor 78 processes received signals to yield decoded information, and encodes information of outgoing signals to be transmitted. According to the illustrated embodiment, baseband processor 78 includes a receive input 130, a transmit output 132, and a control interface 134. Receive input 130 receives signals from converters 76a, and transmit output 132 sends outgoing signals to converter 76b. Control interface 134 communicates with converters 76 and transmit adjuster 74b.

According to the illustrated embodiment, diversity system 22c includes features for transmitting signals such as converter 76b. Converter 76b comprises an up-converter that converts the frequency of outgoing signals from a baseband frequency band to an RF frequency band. According to the illustrated embodiment, converter 76b includes a local oscillator (LO) 140, a quad modulator 142, an automatic gain control (AGC) 144, amplifiers 146, and an interface 148 coupled as shown. Local oscillator 140 receives signals from a transmit voltage-controlled oscillator (VCO) and a transmit phase-locked loop (PLL) 149 and generates a clock signal. Quad modulator 142 modulates signals, AGC 144 controls the amplitude of signals, and amplifiers 146 amplify signals. Interface 148 communicates with baseband processor 78, converter 76a, and transmit adjuster 74b.

According to the embodiment, transmit adjuster 74b may adjust signals using one or more quality indicators that need not be provided by baseband processor 78. According to one embodiment, transmit adjuster 74b may receive quality indicators from an alternate source other than baseband processor 78. Transmit adjuster 74b may receive quality indicators from, for example, a memory interface 168, a general purpose interface, a serial interface, other suitable interface, or any combination of the preceding.

According to another embodiment, transmit adjuster 74b may generate quality indicators. According to the embodiment, transmit adjuster 74b may receive a signal comprising signal information and generate a quality indicator from the signal information. The signal information may describe, for example, transmit or receive AGC or transmit or receive power. As an example, transmit adjuster 74b may generate a reverse power control bit from a transmit AGC signal or a receive AGC signal. Transmit adjuster 74b may sample an AGC signal for a power control group and an adjacent power control group and compare the samples. The comparison may indicate an increase or decrease from which the reverse power control bit may be determined.

According to one embodiment, transmit adjuster 74b may calculate at least some of the quality indicators, receive at least some of the quality indicators from baseband processor 78, receive at least some of the quality indicators from an alternative source to baseband processor 78, or any combination of the preceding Transmit adjuster 74b may include an interface, a power control bit detection block, control logic, a digital processing block, a test bus, a memory bus, one or more vector modulators, one or more driver amplifiers, one or more power amplifiers, other suitable device, or any combination of the preceding. The power control bit detection block compares the transmit AGC signals of power control groups such as adjacent power control groups to generate reverse power control bits. The control logic controls the operation of the vector modulators, driver amplifiers, and power amplifiers. The control logic instructs the vector modulators, driver amplifiers, power amplifiers, or any combination of the preceding to implement the signal adjustments. As an example, one channel may support PCS CDMA and another channel may support cellular CDMA. Transmit adjuster 74b and baseband processor 78 may use dedicated or separate buses.

According to the illustrated embodiment, transmit adjuster 74b includes amplifiers 160 and 164 and SAWs 162 and 166. Amplifiers 160 and 164 amplify outgoing signals, and SAWs 162 and 164 filter the outgoing signals. According to one embodiment, amplifiers 160a and 164a amplify outgoing signals for one channel path, and amplifiers 160b and 164b amplify outgoing signals for another channel path. SAWs 162a and 164a filter the outgoing signals channel path for one channel path, and SAWs 162b and 164b filter the outgoing signals for another channel path. Transmit adjuster 74b may be fabricated using, for example, a SiGe BiCMOS process, and may be fabricated as a VQFN package.

RF filters 72b filter outgoing signals, and may include a diplexor 110 and one or more duplexors 112. Antenna elements 70 of antenna system 40 transmits the signals.

Various modifications, additions, or omissions may be made to system 22c without departing from the scope of the invention. Moreover, the operations of system 22c may be performed using logic comprising hardware, software, or any combination or arrangement of processors or modules suitable for adjusting a signal as disclosed.

Although an embodiment of the invention and its advantages are described in detail, a person skilled in the art could make various alterations, additions, and omissions without departing from the spirit and scope of the present invention as defined by the appended claims.

What is claimed is:

1. A method for adjusting a signal for transmission at a mobile communication device, comprising:
    converting a baseband transmission signal to a radio frequency (RF) signal;
    receiving said RF signal at an adjuster of said mobile communication device;
    producing a plurality of RF transmit signals based on said RF signal;
    determining one or more quality indicators by generating a reverse power control bit according to the transmit AGC signal;
    establishing a transmit signal adjustment according to the one or more quality indicators;
    separately adjusting at said transmit adjuster at least one of the plurality of RF transmit signals according to the signal adjustment to yield one or more adjusted RF transmit signals; and
    transmitting said adjusted RF transmit signals on a respective plurality of antennas elements.

2. The method of claim 1, wherein:
the one or more quality indicators comprise at least one of a power control group boundary signal, a power control group index, a PN code per active finger, an energy per chip over noise power spectral density ratio per active finger, a channel estimate I/Q per active finger, an energy per bit over noise power spectral density, and a total receive power.

3. The method of claim 1, wherein:
the plurality of signals comprise a plurality of signals transmitted to a base station; and
the one or more quality indicators comprise at least one of a power control group boundary signal, a PN code per active finger, a reverse power control bit per active finger, an energy per chip over noise power spectral density ratio per active finger, a channel estimate I/Q per active finger, a transmit AGC signal, and a total receive power.

4. The method of claim 1, wherein determining the one or more quality indicators further comprises receiving the one or more quality indicators from a baseband processor.

5. The method of claim 1, wherein determining the one or more quality indicators further comprises calculating the one or more quality indicators according to a plurality of received RF signals.

6. The method of claim 1, wherein adjusting at least one of the plurality of RF transmit signals according to the signal adjustment to yield the one or more adjusted RF transmit signals further comprises adjusting at least one of a phase and an amplitude of at least one signal of the plurality of RF transmit signals.

7. A mobile communication device comprising:
a transmit converter for converting a baseband transmit signal to a radio frequency (RF) transmit signal;
a transmit adjuster operable to receive said RF transmit signal from said transmit converter and produce a plurality of RF transmit signals based on said RF signal; and
control logic coupled to the transmit adjuster and operable to:
  determine one or more quality indicators based on a received RF signal by generating a reverse power control bit according to the transmit AGC signal;
  establish a signal adjustment according to the one or more quality indicators; and adjust the plurality of signals according to the signal adjustment to yield one or more adjusted signals, wherein said transmit adjuster is to separately adjust at least one of said RF transmit signals according to the signal adjustment to yield a respective one or more adjusted RF signals;
a plurality of antenna elements connected to said transmit adjuster for transmitting said plurality of RF transmit signals, respectively.

8. The system of claim 7, wherein:
the one or more quality indicators comprise at least one of a power control group boundary signal, a power control group index, a PN code per active finger, an energy per chip over noise power spectral density ratio per active finger, a channel estimate I/Q per active finger, an energy per bit over noise power spectral density, and a total receive power.

9. The system of claim 7, wherein:
the plurality of signals comprise a plurality of signals transmitted to a base station from a mobile device; and
the one or more quality indicators comprise at least one of a power control group boundary signal, a PN code per active finger, a reverse power control bit per active finger, an energy per chip over noise power spectral density ratio per active finger, a channel estimate I/Q per active finger, a transmit AGC signal, and a total receive power.

10. The system of claim 7, further comprising a baseband processor operable to provide the one or more quality indicators to the adjuster.

11. The system of claim 7, the control logic further operable to determine the one or more quality indicators by calculating the one or more quality indicators according to the received RF signal.

12. The system of claim 7, the control logic further operable to adjust the plurality of signals according to the signal adjustment to yield the one or more adjusted signals by adjusting at least one of a phase and an amplitude of at least one signal of the plurality of RF transmit signals.

13. Logic for adjusting a signal, the logic embodied in a medium and operable to:
receive an RF signal for transmission by a mobile communication device;
produce a plurality of RF transmit signals based on said RF signal;
determine one or more quality indicators based on a received RF signal received at said mobile communication device, by generating a reverse power control bit according to the transmit AGC signal;
establish a transmit signal adjustment according to the one or more quality indicators; and
separately adjust at least one of the plurality of RF transmit signals according to the signal adjustment to yield a respective one or more adjusted RF transmit signals.

14. The logic of claim 13, wherein:
the one or more quality indicators comprise at least one of a power control group boundary signal, a power control group index, a PN code per active finger, an energy per chip over noise power spectral density ratio per active finger, a channel estimate I/Q per active finger, an energy per bit over noise power spectral density, and a total receive power.

15. The logic of claim 13, wherein said logic is to further:
receive RF receive signals from a base station; and
wherein the one or more quality indicators are based on said RF receive signals, and said quality indicators comprise at least one of a power control group boundary signal, a PN code per active finger, a reverse power control bit per active finger, an energy per chip over noise power spectral density ratio per active finger, a channel estimate I/Q per active finger, a transmit AGC signal, and a total receive power.

16. The logic of claim 13, further operable to determine the one or more quality indicators by receiving the one or more quality indicators from a baseband processor.

17. The logic of claim 13, further operable to determine the one or more quality indicators by calculating the one or more quality indicators according to a plurality of received RF signals.

18. The logic of claim 13, further operable to adjust the plurality of signals according to the signal adjustment to yield the one or more adjusted signals by adjusting at least one of a phase and an amplitude of at least one signal of the plurality of signals.

19. A mobile communication device, comprising:
means for converting a baseband transmission signal to a radio frequency (RF) transmit signal;
means for producing a plurality of RF transmit signals based on said RF signal;
means for determining one or more quality indicators by generating a reverse power control bit according to the transmit AGC signal;

means for establishing a transmit signal adjustment according to the one or more quality indicators; and means for separately adjusting one or more of the plurality of RF transmit signals according to the signal adjustment to yield respective one or more adjusted RF transmit signals.

20. A method for adjusting a signal, comprising:

converting a baseband transmission signal to a radio frequency (RF) signal;

producing a plurality of RF transmit signals based on said RF signal;

receiving said plurality of RF transmit signals at an adjuster of said mobile communication device;

determining one or more quality indicators by performing at least one of:

calculating at least some of the one or more quality indicators, wherein calculating at least some of the one or more quality indicators further comprises:

receiving a transmit automatic gain control signal; and       generating the at least some of the one or more quality indicators according to the transmit automatic gain control signal; and    receiving at least some of the one or more quality indicators from an alternative source to a baseband processor;

establishing a transmit signal adjustment according to the one or more quality indicators; and separately adjusting one or more of the plurality of RF transmit signals according to the signal adjustment to yield one or more adjusted RF transmit signals.

21. The method of claim 20, wherein calculating at least some of the one or more quality indicators further comprises:

receiving signal quality information; and generating the at least some of the one or more quality indicators according to the signal quality information.

22. The method of claim 20, wherein the one or more quality indicators comprise at least one of a power control group boundary signal, a power control group index, a PN code per active finger, a reverse power control bit per active finger, an energy per chip over noise power spectral density ratio per active finger, a channel estimate I/Q per active finger, an energy per bit over noise power spectral density, a transmit AGC signal, a total receive power.

23. A system for adjusting a signal, comprising an adjuster, wherein said adjuster comprises:

an interface operable to receive a radio frequency (RF) signal; and control logic coupled to the interface and operable to:

determine one or more quality indicators by performing at least one of:

calculate at least some of the one or more quality indicators by:

receiving a transmit automatic gain control signal; and          generating the at least some of the one or more quality indicators according to the transmit automatic gain control signal; and       receive at least some of the one or more quality indicators from an alternative source to a baseband processor;

establish a signal adjustment according to the one or more quality indicators; produce a plurality of RF transmit signals based on said RF signal; and    separately adjust one or more of the plurality of RF transmit signals according to the signal adjustment to yield a plurality of adjusted RF transmit signals.

24. The system of claim 23, the control logic operable to calculate at least some of the one or more quality indicators by:

receiving signal quality information; and generating the at least some of the one or more quality indicators according to the signal quality information.

25. The system of claim 23, wherein the one or more quality indicators comprise at least one of a power control group boundary signal, a power control group index, a PN code per active finger, a reverse power control bit per active finger, an energy per chip over noise power spectral density ratio per active finger, a channel estimate I/Q per active finger, an energy per bit over noise power spectral density, a transmit AGC signal, a total receive power.

26. Logic for adjusting a signal, the logic embodied in a medium and operable to:

receive a radio frequency (RF) signal;

produce a plurality of RF transmit signals based on said RF signal;

determine one or more quality indicators by performing at least one of:

calculating at least some of the one or more quality indicators by:

receiving a transmit automatic gain control signal; and       generating the at least some of the one or more quality indicators according to the transmit automatic gain control signal; and    receiving at least some of the one or more quality indicators from an alternative source to a baseband processor;

establish a signal adjustment according to the one or more quality indicators; and separately adjust one or more of the plurality of RF transmit signals according to the signal adjustment to yield a plurality of adjusted RF transmit signals.

27. The logic of claim 26, further operable to calculate at least some of the one or more quality indicators by:

receiving signal quality information; and generating the at least some of the one or more quality indicators according to the signal quality information.

28. The logic of claim 26, wherein the one or more quality indicators comprise at least one of a power control group boundary signal, a power control group index, a PN code per active finger, a reverse power control bit per active finger, an energy per chip over noise power spectral density ratio per active finger, a channel estimate I/Q per active finger, an energy per bit over noise power spectral density, a transmit AGC signal, a total receive power.

29. A mobile communication system for adjusting a signal, comprising:

an antenna system comprising a plurality of antennas operable to receive and transmit a plurality of received and transmitted RF signals, respectively;

one or more receive adjusters operable to:

receive said plurality of RF signals received at said plurality of antennas;

determine one or more quality indicators based on said plurality of received RF signals:

establish a signal adjustment according to the one or more quality indicators;

adjust at least some of the plurality of received RF signals according to the signal adjustment; and    combine said plurality of adjusted received RF signals to yield a combined adjusted RF signal;

one or more receive converters operable to convert a frequency of the combined adjusted RF signal to a baseband frequency to obtain a combined baseband receive signal; and one or more transmit converters operable to convert a frequency of a baseband transmit signal from baseband frequency to a radio frequency, thereby producing an RF signal for transmission;

one or more transmit adjusters operable to:
receive said RF signal for transmission;
produce a plurality of RF transmit signals based on said RF signal for transmission;
adjust at least one of the plurality of RF transmit signals according to the signal adjustment to produce at least one adjusted RF transmit signal; and
provide said plurality of RF transmit signals to said antenna system;

a baseband processor operable to receive and process the combined baseband receive signal and to produce said baseband transmit signal, wherein the baseband processor is operable to provide at least some of the one or more quality indicators to the one or more transmit and receive adjusters.

30. The system of claim 29, wherein the one or more quality indicators comprise at least one of a power control group boundary signal, a power control group index, a PN code per active finger, a reverse power control bit per active finger, an energy per chip over noise power spectral density ratio per active finger, a channel estimate I/Q per active finger, an energy per bit over noise power spectral density, a transmit AGC signal, and a total receive power.

31. A mobile communication system for adjusting a signal, comprising:

an antenna system comprising a plurality of antennas operable to receive and transmit a plurality of received and transmitted RF signals, respectively;

one or more receive adjusters operable to:
receive said plurality of RF signals received at said plurality of antennas;
determine one or more quality indicators based on said plurality of received RF signals;
establish a signal adjustment according to the one or more quality indicators;
adjust at least some of the plurality of received RF signals according to the signal adjustment; and
combine said plurality of adjusted received RF signals to yield a combined adjusted RF signal;

one or more receive converters operable to convert a frequency of the combined adjusted RF signal to a baseband frequency to obtain a combined baseband receive signal; and one or more transmit converters operable to convert a frequency of a baseband transmit signal from baseband frequency to a radio frequency, thereby producing an RF signal for transmission;

one or more transmit adjusters operable to:
receive said RF signal for transmission;
produce a plurality of RF transmit signals based on said RF signal for transmission;
adjust at least one of the plurality of RF transmit signals according to the signal adjustment to produce at least one adjusted RF transmit signal; and
provide said plurality of RF transmit signals to said antenna system;

a baseband processor operable to receive and process the combined baseband receive signal and to produce said baseband transmit signal, wherein at least one of the one or more transmit and receive adjusters is operable to generate at least some of the one or more quality indicators.

32. The system of claim 31, wherein the one or more quality indicators comprise at least one of a power control group boundary signal, a power control group index, a PN code per active finger, a reverse power control bit per active finger, an energy per chip over noise power spectral density ratio per active finger, a channel estimate I/Q per active finger, an energy per bit over noise power spectral density, a transmit AGC signal, and a total receive power.

33. A mobile communication system for adjusting a signal, comprising:

an antenna system comprising a plurality of antennas operable to receive and transmit a plurality of received and transmitted RF signals, respectively;

one or more receive adjusters operable to:
receive said plurality of RF signals received at said plurality of antennas;
determine one or more quality indicators based on said plurality of received RF signals;
establish a signal adjustment according to the one or more quality indicators;
adjust at least some of the plurality of received RF signals according to the signal adjustment; and
combine said plurality of adjusted received RF signals to yield a combined adjusted RF signal;

one or more receive converters operable to convert a frequency of the combined adjusted RF signal to a baseband frequency to obtain a combined baseband receive signal; and one or more transmit converters operable to convert a frequency of a baseband transmit signal from baseband frequency to a radio frequency, thereby producing an RF signal for transmission;

one or more transmit adjusters operable to:
receive said RF signal for transmission;
produce a plurality of RF transmit signals based on said RF signal for transmission;
adjust at least one of the plurality of RF transmit signals according to the signal adjustment to produce at least one adjusted RF transmit signal; and
provide said plurality of RF transmit signals to said antenna system;

a baseband processor operable to receive and process the combined baseband receive signal and to produce said baseband transmit signal, further comprising an alternate source operable to provide at least some of the one or more quality indicators to the one or more transmit and receive adjusters.

34. The system of claim 33, wherein the one or more quality indicators comprise at least one of a power control group boundary signal, a power control group index, a PN code per active finger, a reverse power control bit per active finger, an energy per chip over noise power spectral density ratio per active finger, a channel estimate I/Q per active finger, an energy per bit over noise power spectral density, a transmit AGC signal, and a total receive power.

35. A mobile communication system for adjusting a signal, comprising:

an antenna system comprising a plurality of antennas operable to receive and transmit a plurality of received and transmitted RF signals, respectively;

one or more receive adjusters operable to:
receive said plurality of RF signals received at said plurality of antennas;

determine one or more quality indicators based on said plurality of received RF signals;
establish a signal adjustment according to the one or more quality indicators;
adjust at least some of the plurality of received RF signals according to the signal adjustment; and
combine said plurality of adjusted received RF signals to yield a combined adjusted RF signal;
one or more receive converters operable to convert a frequency of the combined adjusted RF signal to a baseband frequency to obtain a combined baseband receive signal; and
one or more transmit converters operable to convert a frequency of a baseband transmit signal from baseband frequency to a radio frequency, thereby producing an RF signal for transmission;
one or more transmit adjusters operable to:
receive said RF signal for transmission;
produce a plurality of RF transmit signals based on said RF signal for transmission;
adjust at least one of the plurality of RF transmit signals according to the signal adjustment to produce at least one adjusted RF transmit signal; and
provide said plurality of RF transmit signals to said antenna system;
a baseband processor operable to receive and process the combined baseband receive signal and to produce said baseband transmit signal,
wherein the transmit adjuster is operable to:
determine one or more quality indicators by performing at least one of:
calculate at least some of the one or more quality indicators; and
receive at least some of the one or more quality indicators from an alternative source to the baseband processor.

* * * * *